Patented Oct. 25, 1938

2,133,999

UNITED STATES PATENT OFFICE 2,133,999

ARYL-METHYL ETHERS OF β-METHYLCHOLINE SALTS AND PROCESSES FOR THEIR PRODUCTION

Randolph T. Major, Plainfield, N. J., assignor to Merck & Co. Inc., Rahway, N. J., a corporation of New Jersey No Drawing. Application March 1, 1937, Serial No. 128,490

8 Claims. (Cl. 260—584)

This invention relates to aryl-methyl ethers of β-methylcholine salts, compounds suitable for therapeutic use, and to processes for their production.

These aryl-methyl ethers of β-methylcholine salts have not been described previously in the literature. Their general formula is as follows:

(CH₃)₃NXCH₂CHCH₃OCH₂Ar, where X is the radical of an acid whose silver salt is more soluble than silver iodide, and Ar represents an aryl radical.

My experiments indicate that the most satisfactory and convenient method of producing these aryl-methyl ethers of β-methyl choline salts is from the corresponding aryl-methyl dimethylamino isopropyl ether, through the corresponding methiodide, thus:—

Aryl dimethylamino isopropyl ether
↓
Aryl-methyl-ether of β-methyl choline iodide
↓
Aryl-methyl-ether of β-methyl choline salt of acid whose silver salt is more soluble than silver iodide.

Generally speaking, this may be accomplished by treating dimethylaminoisopropanol with an alkali metal, such as potassium for example, in an inert solvent such as benzene and toluene. The resulting alcohol salt may be treated with an aryl-methyl halide, such as benzyl bromide, and the dimethyl aminoisopropyl aryl-methyl-ether may then be treated with methyl iodide to form the corresponding methiodide, after which the chlorides or other desired salts may be prepared from the iodides, as may be required.

For the preparation of the new aryl-methyl-ethers of β-methylcholine salts, the following will serve as an example:

Preparation of benzyl dimethylaminoisopropyl ether

A mixture of 0.1 mol. of potassium and a solution of 0.1 mol. of dimethylamino-isopropanol in dry benzene is refluxed until all of the metallic potassium has reacted. After the resulting solution has cooled, 0.1 mol. of benzyl bromide is added. This mixture is then refluxed for about two hours. After the mixture cools, the solid which forms, and which consists largely of potassium bromide, is removed by filtration. The filtrate is extracted with dilute hydrochloric acid. The aqueous layer is made alkaline by treatment with sodium carbonate followed by sodium hydroxide. It is extracted with ether. The ether solution is dried with sodium carbonate and then fractionated. After three fractionations, pure benzyl dimethyl aminoisopropyl ether boiling at about 135° is obtained.

Preparation of benzyl ether of β-methylcholine iodide

To a solution of about 0.01 mol. benzyl dimethyl aminoisopropyl ether in benzene is slowly added a slight excess of methyl iodide. A white precipitate forms almost immediately. It is separated by filtration.

Preparation of benzyl ether of β-methylcholine chloride

A solution of 0.003 mol. of the benzyl ether of β-methylcholine iodide is shaken with about 0.006 mol. of silver chloride, until the reaction is complete. The reaction mixture is filtered and the filtrate saturated with hydrogen sulfide. The resulting mixture is treated with a little charcoal and then filtered. By the addition of dry ether to the somewhat concentrated alcoholic filtrate, the benzyl ether of β-methylcholine chloride is obtained in the form of crystals having a melting point of about 161° C.

The process as above described may also be applied to the production of other salts besides the chlorides. Obviously, such other salts of acids may be thus prepared where the acid involved is one whose silver salts are more soluble than silver iodide.

The process obviously may also be extended to the production of other aryl-methyl ethers of the desired β-methylcholine salts, the benzyl ether being here exemplified for purposes of illustration and not of limitation.

I claim as my invention:

1. Methyl ethers of β-methylcholine salts of acids whose silver salts are more soluble than silver iodide, in which a radical of the benzene series is substituted in the methyl group.

2. The benzyl ether of β-methylcholine salts of acids whose silver salts are more soluble than silver iodide.

3. The benzyl ether of β-methylcholine chloride.

4. As intermediates in the production of methyl ethers of β-methylcholine salts of acids whose silver salts are more soluble than silver iodide, in which a radical of the benzene series is substituted in the methyl group, correspondingly substituted dimethyl aminoisopropyl ethers.

5. As intermediates in the production of methyl ethers of β-methylcholine salts of acids whose silver salts are more soluble than silver iodide, in which a radical of the benzene series is substituted in the methyl group, correspondingly substituted ethers of β-methylcholine iodide.

6. A process for the production of methyl ethers of β-methylcholine salts, in which a radical of the benzene series is substituted in the methyl group, which comprises preparing correspondingly substituted dimethylaminoisopropyl ethers, reacting upon these with methyl iodide, and then treating the methiodides thus obtained with the silver salt of an acid whose silver salt is more soluble than silver iodide.

7. A process for the production of methyl ethers of β-methyl choline salts, in which a radical of the benzene series is substituted in the methyl group, which comprises treating dimethylaminoisopropanol with an alkali metal in an inert solvent, treating the resulting alcohol salt with a methyl halide in which a radical of the benzene series is substituted in the methyl group, reacting upon the correspondingly substituted dimethylaminoisopropyl ether thus obtained with methyl iodide to form the corresponding methiodide, and then reacting upon the methiodide with the silver salt of an acid whose silver salt is more soluble than silver iodide.

8. A process for the production of the methyl ethers of β-methylcholine chloride in which a radical of the benzene series is substituted in the methyl group which comprises treating dimethylaminoisopropanol with potassium, treating the resulting alcohol salt with benzyl bromide, reacting upon the benzyl dimethylaminoisopropyl ether with methyl iodide, and reacting upon the methiodide with silver chloride.

RANDOLPH T. MAJOR.